US012349715B2

(12) United States Patent
Shirasawa et al.

(10) Patent No.: US 12,349,715 B2
(45) Date of Patent: Jul. 8, 2025

(54) METHOD OF PRODUCING CONTAINER-PACKED PROCESSED FOOD WITH NOODLES

(71) Applicants: SHINGEN FOODS CO., LTD., Koushu (JP); TABLE STOCK CO., LTD., Koushu (JP)

(72) Inventors: Satoshi Shirasawa, Koushu (JP); Miku Tsushima, Koushu (JP)

(73) Assignees: SHINGEN FOODS CO., LTD., Koushu (JP); TABLE STOCK CO., LTD., Koushu (JP)

(*) Notice: Subject to any disclaimer, the term of this patent is extended or adjusted under 35 U.S.C. 154(b) by 335 days.

(21) Appl. No.: 17/549,900

(22) Filed: Dec. 14, 2021

(65) Prior Publication Data
US 2022/0295839 A1    Sep. 22, 2022

(30) Foreign Application Priority Data

Mar. 17, 2021   (JP) .................. 2021-043122

(51) Int. Cl.
A23L 7/113     (2016.01)
A23B 2/30      (2025.01)
A23B 2/80      (2025.01)
A23L 5/10      (2016.01)
A23L 7/109     (2016.01)
A23L 27/10     (2016.01)
B65B 25/00     (2006.01)

(52) U.S. Cl.
CPC .............. *A23L 7/113* (2016.08); *A23B 2/30* (2025.01); *A23B 2/80* (2025.01); *A23L 5/13* (2016.08); *A23L 7/111* (2016.08); *A23L 27/10* (2016.08); *B65B 25/001* (2013.01)

(58) Field of Classification Search
CPC ..... A23L 3/10; A23L 3/36; A23L 5/13; A23L 7/111; A23L 27/10; A23L 29/30; A23L 33/12; A23L 33/13; A23L 33/145; A23L 7/109–113; A23L 23/00–10; A23L 29/35; B65B 25/001; B65D 81/34; A23V 2300/20; A23V 2300/24; A23V 2250/5114; A23B 2/30; A23B 2/80
See application file for complete search history.

(56) References Cited

U.S. PATENT DOCUMENTS

| 3,300,319 | A | * | 1/1967 | Marotta | A23L 27/60 426/589 |
| 5,204,135 | A | * | 4/1993 | Huang | A23L 29/35 426/399 |
| 5,902,626 | A | * | 5/1999 | Hong | A23L 23/00 426/409 |
| 7,998,512 | B1 | * | 8/2011 | Stevens | A23P 20/25 426/94 |
| 2005/0244563 | A1 | * | 11/2005 | Cavalieri | A23L 29/35 426/589 |
| 2006/0188633 | A1 | * | 8/2006 | Matsuda | A23L 33/10 426/549 |
| 2016/0374369 | A1 | * | 12/2016 | Hirano | A23L 33/26 426/589 |
| 2017/0231258 | A1 | * | 8/2017 | Hirano | A23L 7/1965 514/58 |
| 2022/0000155 | A1 | * | 1/2022 | Goldstein | A23L 27/60 |

FOREIGN PATENT DOCUMENTS

| JP | S54-105249 | 8/1979 |
| JP | H04-218349 | 8/1992 |
| JP | 2001-136898 | 5/2001 |
| JP | 2001314163 | 11/2001 |
| JP | 2002-345423 | 12/2002 |
| JP | 2004229570 | 8/2004 |
| JP | 2006-081433 | 3/2006 |
| JP | 4063459 | 3/2008 |
| JP | 2011-083210 | 4/2011 |
| JP | 2012-130256 | 7/2012 |
| JP | 5027190 | 9/2012 |
| JP | 5498369 | 5/2014 |
| JP | 2019-071838 | 5/2019 |

(Continued)

OTHER PUBLICATIONS

Translation of JP 2004/000001A (Year: 2004).*
Abstract for JP 2001/078696A (Year: 2001).*
Abstract for JP 2012/100550A (Year: 2012).*
Abstract for JP 02117353A (Year: 1990).*
Abstract for JP 06319474A (Year: 1994).*
Abstract for JP 2011000024A (Year: 2011).*
Abstract for JP 2017158446A (Year: 2017).*
Translation of JP 04121152A (Year: 1992).*
Translation of JP 2011000024A (Year: 2011).*
Translation of JP 2012100550A (Year: 2012).*
Translation of JP 2009065878A (Year: 2009).*

(Continued)

*Primary Examiner* — Drew E Becker
(74) *Attorney, Agent, or Firm* — JMB Davis Ben-David

(57) ABSTRACT

An objective of the present invention is to provide a method of producing a container-packed processed food with noodles, wherein the container-packed processed food with noodles is prevented from collapsing by cooking or boiling, and maintained in an appropriate firmness even after stored for a long period of time, without impairing an original taste of a raw material of the noodles.
The above objective is solved by a method of producing container-packed processed food with noodles, including: subjecting noodles to boil heat treatment and steam heat treatment, and subjecting the treated noodles to freeze treatment to obtain frozen noodles; and subjecting a container filled with the frozen noodles and a seasoning liquid containing a starch degradation product having a DE value of 4 to 18 in the range of 25% by mass and 40% by mass to heat sterilization treatment to obtain a container-packed processed food with noodles.

4 Claims, No Drawings

(56) References Cited

FOREIGN PATENT DOCUMENTS

| | | |
|---|---|---|
| JP | B6923986 | 8/2021 |
| WO | 2016/031525 | 6/2017 |

OTHER PUBLICATIONS

International Search Report of corresponding PCT application (Japanese version—10 pages).

Notification concerning transmittal of copy of international preliminary report on patentability (Form PCT/IB/326) of PCT/JP2022/010853 Date NA.

International preliminary report on patentability (Form PCT/IB/373) of PCT/JP2022/010853 Date NA.

Notification of transmittal of copies of translation of the international preliminary report on patentability (Form PCT/IB/338) of PCT/JP2022/010853 Date NA.

Translation of International preliminary report on patentability (Form PCT/IB/373) of PCT/JP2022/010853 Date NA.

European Patent Office, Extended European Search Report of corresponding EP Patent Application No. 22771304.7 Date of Issuance: Feb. 7, 2025, pp. 1-6, Germany.

Korean Patent Office, Office Action for Korean Patent Application No. Patent Application No. 10-2022-7017107, Date of Issuance: Mar. 25, 2025, pp. 1-6.

* cited by examiner

METHOD OF PRODUCING CONTAINER-PACKED PROCESSED FOOD WITH NOODLES

TECHNICAL FIELD

The present invention relates to a method of producing a container-packed processed food with noodles, wherein the container-packed processed food with noodles is prevented from collapsing by cooking or boiling, and maintained in an appropriate firmness even after stored for a long period of time.

BACKGROUND ART

Processed foods of noodles, which have been cooked, such as pasta, Japanese wheat noodles (udon), Japanese buckwheat noodles (soba), and Chinese noodles (ramen) are required to maintain their appropriate "Koshi (chewy texture)" (springiness (firmness)) without collapsing by cooking or boiling. In particular, of the processed food products, those intended for long-term storage are difficult to prevent them from collapsing by cooking or boiling, and to maintain their appropriate "Koshi (chewy texture)" (springiness (firmness)).

For example, pasta, in which wheat is used generally as a raw material, has a dense internal structure and a unique texture having smooth mouthfeel and an appropriate al dente texture (firmness). Therefore, in processed foods using pasta that have been cooked, maintaining the unique and inherent texture of pasta is important element to enhance its commercial value.

In recent years, as a means for preventing noodles from collapsing or mushing, for example, a method by adding a collapse-preventing agent (additive) to a raw material for noodle making has been known. (See, for example, Patent Documents 1 to 5.)

In addition, as a method for obtaining a seasoned pasta in a container having an al dente texture even when stored for a long period of time, a method including filling a pasta having absorbed water, which is formed from dried pasta by absorbing water, and a seasoning liquid product, which is made by dissolving dextrin, in a container, sealing and then subjecting the container to retort sterilization treatment has been known. (See, for example, Patent Documents 6 and 7.)

CITATION LIST

Patent Documents

[Patent Document 1] Japanese Unexamined Patent Publication No. 04-218349
[Patent Document 2] Japanese Unexamined Patent Publication No. 2001-136898
[Patent Document 3] Japanese Unexamined Patent Publication No. 2002-345423
[Patent Document 4] Japanese Unexamined Patent Publication No. 2006-081433
[Patent Document 5] Japanese Unexamined Patent Publication No. 2011-083210
[Patent Document 6] Japanese Patent No. 5027190
[Patent Document 7] Japanese Patent No. 5498369

SUMMARY OF THE INVENTION

Problems to be Solved by the Invention

However, the method by adding an additive has problems that an original taste of a raw material of noodles is impaired and/or strange feeling on the taste of the additive is presented.

In addition, the method including filling in a container a pasta having absorbed water and a seasoning liquid product obtained by dissolving dextrin, and subjecting the container to retort sterilization treatment has a problem that when the type of the pasta is raw or fresh, it is difficult to maintain a sufficient al dente texture (firmness) since its water content is higher than that of dried pasta.

Therefore, for the problems to be solved, the present invention is to provide a method of producing a container-packed processed food with noodles, wherein the container-packed processed food with noodles can be prevented from collapsing by cooking or boiling, and maintained in an appropriate firmness even after stored for a long period of time, without impairing an original taste of a raw material of the noodles.

Moreover, for the problems to be solved, the present invention is to provide a method of producing a container-packed processed food with noodles, wherein even when raw or fresh type noodles are used as the noodles, the container-packed processed food with noodles can be prevented from collapsing by cooking or boiling, and maintained in an appropriate firmness even after stored for a long period of time.

Means of Solving the Problems

In order to solve the above problems, the present inventors have re-evaluated seasoning liquids added during cooking pasta, instead of improving the physical characteristics of pasta itself in the course of extensive efforts. Finally, the present inventors successfully achieved preventing pasta from collapsing by cooking or boiling, and maintaining it in an appropriate firmness even after long-term storage, without impairing an original taste of a raw material of the pasta, by subjecting a container filled with a frozen pasta obtained through a specific pretreatment process and a seasoning liquid containing a starch degradation product having a specific DE value in a specific concentration to heat sterilization treatment. In addition, surprisingly, it was found that according to the above method, noodles other than pasta, such as Chinese noodles, Japanese wheat noodles (udon), and the like, can be prevented from collapsing by cooking or boiling, and maintained in an appropriate firmness even after stored for a long period of time, without impairing an original taste of a raw material of the noodles. Furthermore, surprisingly, it was found that according to the above method, even when the type of the noodles is raw or fresh, the noodles can be prevented from collapsing by cooking or boiling, and maintained in an appropriate firmness even after stored for a long period of time. The present invention has been completed based on such successful examples and findings.

Therefore, according to one embodiment of the present invention, the following [1] to [6] are provided:
[1] A method of producing a container-packed processed food with noodles, including:
  subjecting noodles to boil heat treatment and steam heat treatment, and subjecting the treated noodles to freeze treatment to obtain frozen noodles; and subjecting a container filled with the frozen noodles and a seasoning liquid containing a starch degradation product having a DE value of 4 to 18 in the range between 25% by mass and 40% by mass to heat sterilization treatment to obtain the container-packed processed food with noodles.

[2] The method according to [1], wherein the container-packed processed food with noodles has a breaking strength of the noodles after storage for 30 days within ±20% of that of noodles subjected only to normal boil heat treatment.

[3] The method according to [1] or [2], wherein the starch degradation product has a DE value of 8 to 12.

[4] The method according to any one of [1] to [3], wherein the noodles are at least one selected from the group consisting of Chinese noodles, pasta, and Japanese wheat noodles (udon).

[5] The method according to any one of [1] to [4], wherein the noodles subjected to boil heat treatment and steam heat treatment are raw or fresh noodles.

[6] A method for preventing noodles from collapsing by cooking or boiling, including:
subjecting noodles to boil heat treatment and steam heat treatment, and subjecting the treated noodles to freeze treatment to obtain frozen noodles; and
immersing the frozen noodles in a seasoning liquid containing a starch degradation product having a DE value of 4 to 18 in the range between 25% by mass and 40% by mass.

[7] A container-packed processed food with noodles, comprising:
noodles; and
a seasoning liquid containing a starch degradation product having a DE value of 4 to 18 in the range between 25% by mass and 40% by mass,
wherein the container-packed processed food with noodles has a breaking strength of the noodles after storage for 30 days within ±20% of that of noodles subjected only to normal boil heat treatment.

[8] The container-packed processed food with noodles according to [7], wherein the starch degradation product has a DE value of 8 to 12.

[9] The container-packed processed food with noodles according to [7], wherein the noodles are at least one selected from the group consisting of Chinese noodles, pasta, and Japanese wheat noodles (udon).

[10] The container-packed processed food with noodles according to [7], wherein the container is a retort container.

[11] The container-packed processed food with noodles according to [7], wherein the container is a can.

Effect of the Invention

According to a method of producing a container-packed processed food with noodles according to one embodiment of the present invention, it is possible to produce a container-packed processed food with noodles, wherein the container-packed processed food with noodles can be prevented from collapsing by cooking or boiling, and maintained in an appropriate firmness even after stored for a long period of time, without impairing an original taste of a raw material of the noodles.

Further, according to the method of producing a container-packed processed food with noodles according to one embodiment of the present invention, it is possible to produce a container-packed processed food with noodles, wherein even when raw or fresh type noodles are used as the noodles, the container-packed processed food with noodles can be prevented from collapsing by cooking or boiling, and maintained in an appropriate firmness even after stored for a long period of time.

According to the method for preventing noodles from collapsing by cooking or boiling according to one embodiment of the present invention, noodles less collapsing by cooking or boiling can be obtained without impairing an original taste of a raw material of the noodles.

DESCRIPTION OF EMBODIMENTS

While a method of producing a container-packed processed food with noodles (hereinafter, also simply referred to as a "processed food with noodles" or a "processed food") according to one embodiment of the present invention will now be described in further details, the scope of the present invention is not limited to what is described in this section; rather, the present invention may take various other forms to the extent that its objective is achieved.

The method of producing a processed food with noodles according to one embodiment of the present invention includes the following steps:
subjecting noodles to boil heat treatment and steam heat treatment, and subjecting the treated noodles to freeze treatment to obtain frozen noodles; and
subjecting a container filled with the frozen noodles and a seasoning liquid containing a starch degradation product having a DE value of 4 to 18 in the range between 25% by mass and 40% by mass to heat sterilization to obtain a processed food with noodles.

The processed food produced by the production method of the present invention is a container-packed processed food with noodles that at least noodles and a seasoning liquid are filled and sealed in a container.

Specifically, the method of producing a processed food with noodles according to one embodiment of the present invention includes a pretreatment process including: subjecting noodles to boil heat treatment (1); subjecting the boil-heated noodles to steam heat treatment (2); and subjecting the steam-heated noodles to freeze treatment (3), and a heat sterilization treatment process of subjecting a container filled with the frozen noodles obtained through the pretreatment process and a seasoning liquid containing a starch degradation product having a DE value of 4 to 18 in the range between 25% by mass and 40% by mass to heat sterilization treatment.

Unless otherwise specified, each term used herein is used in the meaning commonly used by those skilled in the art and should not be construed to have any meaning that is unduly limiting.

The term "content" as used herein is equivalent to "concentration" and means the proportion (for example, % by mass) of the amount (for example, mass) of a component relative to the total amount (for example, volume) of a seasoning liquid containing the component.

The terms "include," "comprise," and "contain" mean that an element(s) other than an element(s) as explicitly indicated can be added as inclusions, which are, for example, synonymous with "at least include," but encompasses the meaning of "consist of" and "substantially consist of". In other words, the terms may mean, for example, to include an element(s) as explicitly indicated as well as any one element or any two or more elements, to consist of an element(s) as explicitly indicated, or substantially consist of an element(s)

as explicitly indicated. Such elements include limitations such as components, processes, conditions, and parameters.

The wording "to" for indicating a range of values is intended to include values preceding and following the wording; for example, "0% to 100%" means the range from 0% or more and 100% or less. The wording "more than" and "less than" mean the lower limit and the upper limit, respectively, without including the following numerical value. For example, "more than 1" is a numerical value greater than 1, and "less than 100" is a numerical value smaller than 100.

The number of digits of an integer equals to its significant figure. For example, 1 has one significant figure and 10 has two significant figures. For a decimal number, the number of digits after a decimal point equals to its significant figure. For example, 0.1 has one significant figure and 0.10 has two significant figures.

(1) Boil Heat Treatment Process

The boil heat treatment process is a process of boil-heating (heating by boiling) noodles. It is considered that the surface of the noodle is gelatinized through this boil heat treatment process. By gelatinizing the surface of the noodle, it is possible to prevent the noodles from sticking each other and becoming a lump during the subsequent heat sterilization process.

The conditions for the boil heat treatment are not particularly limited as long as the surfaces of the noodles are gelatinized, and can be appropriately determined according to, for example, the type and shape of the noodles. For example, the boil temperature is preferably 80° C. to 100° C., and the boil time is preferably 1 minute to 5 minutes, more preferably 1 minute to 2 minutes.

The method of the boil heat treatment is not particularly limited, and any boil heat treatment commonly used in food production can be employed. It includes, for example, boiling noodles in boiling water.

The noodles are not particularly limited as long as they are produced by shaping a dough made from cereal flour as a raw material, and examples of them include Chinese noodles, Japanese wheat noodles (udon), and pasta (long pasta, short pasta, etc.). For the raw material of the noodles, use of wheat is preferable, and more preferable is use of wheat in 50% or more. Further, both type of noodles, raw or fresh noodles and dried noodles, can be used for the noodles. In particular, according to the method of producing a processed food with noodles according to one embodiment of the present invention, even when the type of noodles is raw or fresh, it is possible to prevent from collapsing by cooking or boiling, and maintain their appropriate firmness in spite after stored for a long period of time.

While the moisture value (water content) of the noodles is not particularly limited, for example, when the type of the noodles is raw or fresh, it is about 30% to about 40%, preferably about 32% to about 35%, and when the type is dried noodles, it is about 10% to about 15%.

In addition, the moisture value of the noodles after the boil heat treatment process is not particularly limited, and, for example, is preferably about 50% to about 60%.

(2) Steam Heat Treatment Process

The steam heat treatment process is a process of draining water from boil-heated noodles and then steam-heating (heating by steam) the noodles. It is considered that water can sufficiently permeate into the inside of the boil-heated noodle, particularly the central part of the boil-heated noodle, through this steam heat treatment process.

While the conditions for the steam heat treatment are not particularly limited as long as water sufficiently permeates into the inside of the noodle, for example, the steam temperature is preferably 80° C. to 100° C., and the steam time is preferably 15 minutes to 120 minutes, more preferably 30 minutes to 60 minutes.

While the steam heat treatment method is not particularly limited, a commercially available steamer or a steam cooker can be used. Examples of commercially available steamers include steam convection ovens (manufactured by Maruzen Co., Ltd.).

In the steam heat treatment process, it is preferable that the noodles are sealed in a packaging material made of a heat-resistant material and then heat-treated. By heat-treating the noodles in a state of being sealed with a such packaging material, the heating operation can be facilitated, as well as the noodles can be prevented from collapsing during the steam heat treatment. The packaging material is not particularly limited as long as it is a heat-resistant material, and its examples include heat-resistant plastic materials, aluminum materials, and the like.

In the steam heat treatment process, when the noodles are heat-treated in a state of being sealed in the packaging material, the moisture value (water content) of the noodles after the steam heat treatment process become same level as that after the boil heat treatment process.

(3) Freeze Treatment Process

The freeze treatment process is a process of subjecting the steam-heated noodles to freeze treatment to obtain frozen noodles. It is considered that the water that has permeated to the inside of the noodle by the steam heat treatment process is frozen through this freeze treatment process. Then, in the subsequent heat sterilization process, the frozen water in the inside of the noodle can be thawed, thereby cavities in the inside of the noodle can be formed, and the seasoning liquid can permeate to the inside of the noodle.

The freeze treatment method is not particularly limited, and a freezing method commonly used in food production can be adopted. Specifically, examples of the methods include air freezing methods, air blast freezing methods, contact freezing methods, brine freezing methods, freezing methods using liquid nitrogen, liquefied gas freezing methods, Cells Alive System freezing methods, and the like. For example, in the case of air freezing methods, freezing is performed by allowing 72 hours or more to pass in a freezer at −15° C. or lower.

For the freeze treatment, for example, a freezing stocker (manufactured by JCM CO., LTD.) can be used.

When noodles in a state of being sealed in a packaging material has been heat-treated in the previous steam heat treatment process, in this freeze treatment process as well, it is preferable that the noodles still in the state of being sealed in the packaging material are subjected to freeze treatment.

(4) Heat Sterilization Process

The heat sterilization treatment process is a process of subjecting to heat sterilization treatment a container filled with the frozen noodles obtained in the pretreatment process and a seasoning liquid containing 25% by mass to 40% by mass of a starch degradation product having a DE value of 4 to 18. Through this heat sterilization treatment process, the seasoning liquid can permeate into cavities in the inside of the noodle formed through the course of the pretreatment process.

The frozen noodles may be thawed and then filled in a container together with a seasoning liquid, or may be still in the frozen state and filled in a container together with a seasoning liquid, before being subjected to the heat sterilization treatment. As methods for the thawing treatment, a thawing method commonly used in food production can be adopted.

The seasoning liquid contains a starch degradation product having a DE value of 4 to 18 in the range between 25% by mass and 40% by mass. Specifically, the seasoning liquid is a mixture of a starch degradation product having a DE value of 4 to 18 in the range between 25% by mass and 40% by mass and other components in the range between 60% by mass and 75% by mass. The aforementioned other components are not particularly limited, and are, for example, water, seasonings (salt, soy sauce, miso, sugar, vinegar, etc.), yeast extract, meat extract (chicken extract, pork extract, beef extract, fish meat extract, etc.), fruit juice (apple juice, etc.), vegetable juice (tomato puree, etc.), spices (ginger, *capsicum*, pepper, basil, oregano, etc.), coloring agents, amino acid-based seasonings, nucleic acid-based seasonings, organic acid-based seasonings, flavor enhancing additives, flavors, and the like, and they can be used either individually or in combination of two or more.

The starch degradation product is a starch degradation product having a DE value of 4 to 18, and can be used without particular limitation as long as it can be used commonly for foods.

The term "starch degradation product" is a general term for a product obtained by degrading a starch to an appropriate molecular weight using an enzyme and/or an acid. Specifically, examples of the starch degradation product having a DE value of 4 to 18 include dextrin having a DE value of about 4 to about 10 and maltodextrin having a DE value of about 10 to about 18. In addition, the starch degradation products having a DE value of 4 to 18 can be used either individually or in combination of two or more.

The combining ratio of the frozen noodles and the seasoning liquid can be appropriately determined depending on the type of noodles, the type of product, and the like. For example, the mass ratio (noodles:seasoning liquid) is preferably 100:100 to 100:55.

The starch degradation product in the seasoning liquid has a DE value of 4 to 18, preferably 8 to 12. The smaller the DE value is, the lower its sweetness is, and the higher its viscosity is. On the other hand, the greater the DE value is, the higher its sweetness is, and the lower its viscosity is. Therefore, when a starch degradation product having a DE value of less than 4 is used, as the viscosity of the starch degradation product is higher, the viscosity of the entire seasoning liquid also become higher, and the noodles will be difficult to blend together with the seasoning liquid. On the other hand, when a starch degradation product having a DE value of more than 18 is used, as the starch degradation product has a higher degree of sweetness, the degree of sweetness of the entire seasoning liquid also become higher, and the taste will be impaired.

The starch degradation product having a DE value of 4 to 18 is contained in the seasoning liquid in the amount of 25% by mass to 40% by mass, preferably 25% by mass to 35% by mass. When the content of the starch degradation product is less than 25% by mass, it is impossible to allow the noodles to maintain its appropriate firmness. On the other hand, when the content of the starch degradation product is more than 40% by mass, the viscosity of the entire seasoning liquid becomes higher, and the noodles will be difficult to blend together with the seasoning liquid.

While the method for preparing the seasoning liquid is not particularly limited, it can be prepared by measuring, mixing or blending, and as necessary heating the starch degradation product having a DE value of 4 to 18 and other components.

In the heat sterilization treatment process, other ingredients (food materials) can be filled in a container together with the frozen noodles and the seasoning liquid. The aforementioned other ingredients include, but are not limited to, for example, meat, seafoods, vegetables, fruits, soybean products, and the like. Further, these other ingredients may be those having subjected to cooking process with the seasoning liquid. While the blending amount of the aforementioned other ingredients is appropriately determined depending on, for example, the type of product, and is not particularly limited, it is, for example, in the range between 5% by mass and 15% by mass with respect to the total amount of the noodles and the seasoning liquid.

The heat sterilization treatment method is not particularly limited, and a heat sterilization treatment method commonly used in food production can be adopted. Specifically, the frozen noodles obtained by the pretreatment process are either thawed, or not thawed as in still frozen state, and then filled in a predetermined container together with the seasoning liquid and, if necessary, other ingredients, followed by sealing and heat sterilizing.

The temperature and time for the heat sterilization treatment can be appropriately determined according to the type of the product, the blending amount, the filling amount, the type of the container, and the like. For example, when the heat sterilization treatment is retort sterilization treatment, it is carried out under pressure at 100° C. to 130° C., preferably about 125° C. for 6 minutes to 15 minutes, preferably 6 minutes to 9 minutes, having an F value, an index of the sterilization strength, of 4 or more, of preferably 5 to 10. Known devices and methods for retort sterilization can be used. For example, in the case of heat sterilization treatment other than retort sterilization, such as heat sterilization treatment for canning and bottling, it can be performed at 121° C. to 135° C. for 5 minutes to 30 minutes.

The container used in the heat sterilization treatment is not particularly limited as long as it is made of a material and a shape capable of exerting resistance against the heat sterilization treatment and of sealing it. Examples of them include packaging containers such as pouches, sachets, bottles, trays, cans, and jars made of, for example, metal such as aluminum, plastic such as PET and PTP, one-layer or stacked-layer (laminated) film, glass, and the like. In particular, when a retort container is used, specifically, examples of the containers include containers manufactured using a stacked-layer (laminated) film provided on its inner side with a heat-weldable resin layer made of an olefin resin such as polypropylene or polyethylene, and provided on its outer side with a layer made of, for example, a resin having a high gas barrier property such as polyester or polyamide and/or aluminum foil. In addition, when a retort container corresponding to a microwave oven is used, it is preferable that a stacked-layer (laminated) film used has a steam spot.

In a processed food with noodles produced as described above, the breaking strength of the noodles after storage for 30 days, more specifically, the breaking strength of the noodles after storage for 30 days and then heating in a water bath filled with boiling water, preferably is within ±20% of the noodles subjected only to normal boil heat treatment (hereinafter, also referred to as "normal heat-treated noodles").

The breaking strength of noodles after storage for 30 days and the breaking strength of normal heat-treated noodles in the processed food with noodles can be measured by a method described in Examples described below. Therefore, the breaking strength of noodles after storage for 30 days and the breaking strength of normal heat-treated noodles in the processed food with noodles are obtained values which are measured according to the method described in Examples described below.

The noodles subjected only to normal boil heat treatment refer to noodles which are same noodles as those used in the processed food with noodles and which are subjected only to boil heat treatment according to the procedure recommended by the manufacturer.

As described above, according to the method of producing a processed food with noodles according to one embodiment of the present invention, it is possible to produce a processed food with noodles that can be prevented from collapsing by cooking or boiling, and maintained in an appropriate firmness even after stored for a long period of time, without impairing an original taste of a raw material of the noodles. The reason why this effect is obtained might not be obvious, but it is considered to be based on the following principle. It should be noted that such principle does not limit the technical scope of the present invention. Briefly, by performing the pretreatment process (boil heat treatment process, steam heat treatment process and freeze treatment process), the surface of the noodle is gelatinized in the boil heat treatment process, and water is sufficiently permeated into the inside of the noodle in the steam heat treatment process, and the water that has permeated into the inside of the noodles is frozen in the freeze treatment process. After such pretreatment process, a heat sterilization treatment process is performed to thaw the frozen water in the inside of the noodles, thereby forming cavities in the inside of the noodles, and allowing the seasoning liquid to permeate into the noodles. As a result, the starch degradation product in the seasoning liquid can be dispersed uniformly and appropriately in the inside of the noodles, thus preventing the noodles from collapsing by cooking or boiling, and maintaining an appropriate firmness even after stored for a long period of time.

The processed food with noodles produced according to the method of producing a processed food with noodles according to one embodiment of the present invention can be stored at room temperature for a long period of time. When eating the processed food with noodles, it can be heated in a water bath filled with boiling water, for example, for 3 minutes to 10 minutes.

The method for preventing noodles from collapsing by cooking or boiling according to one embodiment of the present invention includes:

subjecting noodles to boil heat treatment and steam heat treatment, and subjecting the treated noodles to freeze treatment to obtain frozen noodles; and immersing the frozen noodles in a seasoning liquid containing a starch degradation product having a DE value of 4 to 18 in the range of 25% by mass and 40% by mass.

Specifically, the method for preventing noodles from collapsing by cooking or boiling according to one embodiment of the present invention includes a pretreatment process including: subjecting noodles to boil heat treatment (1); subjecting the boil-heated noodles to steam heat treatment (2); and subjecting the steam-heated noodles to freeze treatment (3), and a immersing process of immersing the frozen noodles obtained through the pretreatment process in a seasoning liquid containing a starch degradation product having a DE value of 4 to 18 in the range between 25% by mass and 40% by mass. In the method for preventing noodles from collapsing by cooking or boiling according to one embodiment of the present invention, the pretreatment process can be carried out in the same manner as the pretreatment process in the method of producing a processed food with noodles according to one embodiment of the present invention. In the immersing process, the frozen noodles just only need to be immersed in the seasoning liquid, and the immersing method is not particularly limited. Further, in the immersing process, the frozen noodles may be thawed and then immersed in the seasoning liquid, or may be in the frozen state and immersed in the seasoning liquid. When the noodles are immersed in the seasoning liquid in the frozen state, it is preferable that after the immersion, the frozen noodles are thawed. Further, after the immersing process, it is preferable to subject the noodles to heat sterilization treatment. By subjecting to the heat sterilization treatment, the seasoning liquid can permeate into the inside of the noodles, and the starch degradation product in the seasoning liquid is dispersed uniformly and appropriately in the inside of the noodles, resulting in that the noodles are prevented from collapsing by cooking or boiling.

Hereinafter, the present invention will be described in more detail with reference to Examples, but the present invention is not limited to these Examples, and the present invention can take various embodiments as long as the problems of the present invention can be solved.

EXAMPLES

[1. Production of Processed Food with Noodles (Long Pasta)]
<Production of Processed Food with Noodles 1>
1-1. Pretreatment Process 1 (Boil Heat Treatment Process)
  Fresh pasta (manufactured by Iijima Noodles Co., Ltd., moisture value 32%, noodle thickness 1.4 mm) 1000 g was put into boiling water in the amount of 10 times or more, and boil-heated for 1 minute while unraveling the pasta.
1-2. Pretreatment Process 2 (Steam Heat Treatment Process)
  Water was drained from the pasta after the boil heat treatment, and the pasta was filled in a packaging material (bag) made of a heat-resistant plastic material. The opening of the packaging material (bag) was sealed using a vacuum sealer, and the sealed pasta was steam-heated at 90° C. for 30 minutes using a steam convection oven (manufactured by Maruzen Co., Ltd.).
1-3. Pretreatment Process 3 (Freeze Treatment Process)
  The pasta after steam-heating was placed in a freezing stocker (JCM CO., LTD.), and frozen at −20° C. for 72 hours to obtain frozen pasta.
1-4. Seasoning Liquid Preparation Process
  A seasoning liquid was prepared by blending the following components: tomato paste 18.68% by mass, olive oil 6.84% by mass, salt 2.22% by mass, processed starch 1.4% by mass, sodium glutamate 0.47% by mass, disodium succinate 0.38% by mass, yeast extract 0.35% by mass, nucleic acid 0.12% by mass, black pepper 0.12% by mass, water 43.47% by mass, and dextrin with a DE value of 8 ("Paindex #1" manufactured by Matsutani Chemical Industry Co., Ltd.) 26% by mass.
1-5. Heat Sterilization Process
  The seasoning liquid 100 g was filled in a retort container ("plain bag for retort" manufactured by Shueidou Co., Ltd.), the frozen pasta 150 g was thawed at room temperature, then taken out from its packaging material (bag), and filled in the retort container. The retort container was sealed at its opening using a vacuum sealer, and heat-sterilized using a shower-type retort sterilizer to prepare a processed food with noodles 1. The conditions for the pressure heat sterilization treatment were set temperature of 125° C., maximum pressure of 0.25 MPa, heating for 9 minutes after the temperature in the apparatus reached 125° C., and an F value of 7.7.

<Production of Processed Food with Noodles 2>

A processed food with noodles 2 was produced in the same manner as in the production of processed food with noodles 1, except that the pretreatment process 2 (steam heat treatment process) and the pretreatment process 3 (freeze treatment process) were not performed.

<Production of Processed Food with Noodles 3>

A processed food with noodles 3 was produced in the same manner as in the production of processed food with noodles 1, except that the pretreatment process 2 (steam heat treatment process) was not performed, as well as the processed food was placed in a refrigerator and refrigerated at 2° C. for 72 hours instead of the pretreatment process 3 (freeze treatment process).

<Production of Processed Food with Noodles 4>

A processed food with noodles 4 was produced in the same manner as in the production of processed food with noodles 1, except that the pretreatment process 2 (steam heat treatment process) was not performed.

<Production of Processed Food with Noodles 5>

A processed food with noodles 5 was produced in the same manner as in the production of processed food with noodles 1, except that the pretreatment process 3 (freeze treatment process) was not performed.

<Production of Processed Food with Noodles 6>

A processed food with noodles 6 was produced in the same manner as in the production of processed food with noodles 1, except that the processed food was placed in a refrigerator and refrigerated at 2° C. for 72 hours instead of the pretreatment process 3 (freeze treatment process).

[2. Measurement of Breaking Strength]

2-1. Measurement Conditions

The breaking strength of noodles (unit: N (Newton)) was measured using "Rheometer CD-500X" manufactured by Sun Scientific Co., Ltd. (plunger used; No. 10 (for shearing force)). The measurement was performed 5 times and the average value was calculated.

2-2. Measuring Method

The processed foods with noodles 1 to 6 produced in 1 above were stored at room temperature for 30 days, then put into boiling water for 10 minutes, and each breaking strength of the noodles immediately after opening its container was measured. The results are shown in Table 1.

In addition, 1000 g of fresh pasta same as the pasta used in the processed foods with noodles 1 to 6 prepared in 1 above was put into boiling water in the amount of 10 times or more, and boil-heated for 5 minutes while unraveling the pasta (normal heat-treated noodles). The breaking strength of this normal heat-treated noodles was 0.3648.

TABLE 1

| | Pretreatment process | | | |
|---|---|---|---|---|
| | Boil heat treatment process | Steam heat treatment process | Freeze treatment process | Breaking strength (N) |
| Normal heat-treated noodles | — | — | — | 0.3648 |
| Processed food with noodles 1 | ✓ | ✓ | ✓ | 0.3426 |
| Processed food with noodles 2 | ✓ | x | x | 0.2636 |
| Processed food with noodles 3 | ✓ | x | / (Refrigeration) | 0.2632 |
| Processed food with noodles 4 | ✓ | x | ✓ | 0.237 |
| Processed food with noodles 5 | ✓ | ✓ | x | 0.2914 |
| Processed food with noodles 6 | ✓ | ✓ | / (Refrigeration) | 0.2988 |

As shown in the results of Table 1, it was found that the processed food with noodles 1 which had undergone the boil heat treatment process, the steam heat treatment process, and the freeze treatment process as pretreatment process can obtain a breaking strength in the same level as that of the normal heat-treated noodles. On the other hand, it was found that the processed foods with noodles 2 to 6 that have not undergone at least any one of the boil heat treatment process, the steam heat treatment process, and the freeze treatment process as pretreatment process fail to obtain a sufficient breaking strength as compared with the normal heat-treated noodles.

[3. Production of Processed Food with Noodles]

<Production of Processed Food with Noodles 7-1>

A processed food with noodles 7-1 was prepared in the same manner as in the production of processed food with noodles 1, except that in "1-4. Seasoning liquid preparation process", the starch degradation product used is 20% by mass of maltodextrin having a DE value of 25 (manufactured by Matsutani Chemical Industry Co., Ltd., "Paindex #3"), and the blending amount of water is 49.47% by mass.

<Production of Processed Foods with Noodles 7-2 to 7-5>

Processed foods with noodles 7-2 to 7-5 were prepared in the same manner as in the production of processed food with noodles 7-1, except that the content of the starch degradation product was 25% by mass, 35% by mass, 40% by mass, and 45% by mass, respectively, and the blending amount of water was 44.47% by mass, 34.47% by mass, 29.47% by mass, and 24.47% by mass, respectively.

<Production of Processed Food with Noodles 8-1>

A processed food with noodles 8-1 was prepared in the same manner as in the production of processed food with noodles 1, except that in "1-4. Seasoning liquid preparation process", the starch degradation product used is 20% by mass of maltodextrin having a DE value of 18 (manufactured by Matsutani Chemical Industry Co., Ltd., "TK-16"), and the blending amount of water is 49.47% by mass.

<Production of Processed Foods with Noodles 8-2 to 8-5>

Processed foods with noodles 8-2 to 8-5 were produced in the same manner as in the production of processed food with noodles 8-1, except that the content of the starch degradation product was 25% by mass, 35% by mass, 40% by mass, and 45% by mass, respectively, and the blending amount of water was 44.47% by mass, 34.47% by mass, 29.47% by mass, and 24.47% by mass, respectively.

<Production of Processed Food with Noodles 9-1>

A processed food with noodles 9-1 was produced in the same manner as in the production of processed food with noodles 1, except that in "1-4. Seasoning liquid preparation process", the starch degradation product used is 20% by mass of maltodextrin having a DE value of 11 (manufactured by Matsutani Chemical Industry Co., Ltd., "Paindex #2"), and the blending amount of water is 49.47% by mass.

<Production of Processed Foods with Noodles 9-2 to 9-5>

Processed foods with noodles 9-2 to 9-5 were produced in the same manner as in the production of processed food with noodles 9-1, except that the content of the starch degradation product was 25% by mass, 35% by mass, 40% by mass, and 45% by mass, respectively, and the blending amount of water was 44.47% by mass, 34.47% by mass, 29.47% by mass, and 24.47% by mass, respectively.

<Production of Processed Food with Noodles 10-1>

A processed food with noodles 10-1 was prepared in the same manner as in the production of processed food with noodles 1, except that in "1-4. Seasoning liquid preparation process", the starch degradation product used is 20% by mass of dextrin having a DE value of 4 (manufactured by Matsutani Chemical Industry Co., Ltd., "Paindex #100"), and the blending amount of water is 49.47% by mass.

<Production of Processed Foods with Noodles 10-2 to 10-5>

Processed foods with noodles 10-2 to 10-5 were produced in the same manner as in the production of processed food with noodles 10-1, except that the content of the starch degradation product was 25% by mass, 35% by mass, 40% by mass, and 45% by mass, respectively, and the blending amount of water was 44.47% by mass, 34.47% by mass, 29.47% by mass, and 24.47% by mass, respectively. However, the processed food with noodles 10-5 could not be produced because the viscosity of the seasoning liquid became too high to mix together with noodles.

[4. Measurement of Breaking Strength]

The processed foods with noodles 7-1 to 10-5 produced in 3 above were stored at room temperature for 30 days, then put into boiling water for 10 minutes, and each breaking strength of the noodles immediately after opening its container was determined in the same manner as the conditions and methods described in 2-1 and 2-2 above. The results are shown in Table 2.

In addition, 1000 g of fresh pasta same as the pasta used in the processed foods with noodles 7-1 to 10-5 above was put into boiling water in the amount of 10 times or more, and boil-heated for 5 minutes while unraveling the pasta (normal heat-treated noodles). The breaking strength of this normal heat-treated noodles was 0.28.

As shown in the results of Table 2, it was found that the processed foods with noodles 7-2 to 7-4, 8-2 to 8-4, 9-2 to 9-4, 10-2 to 10-4 using the seasoning liquid containing 25% by mass to 40% by mass of the starch degradation product can obtain a breaking strength in the same level as that of normal heat-treated noodles. In addition, it was found that the breaking strength was increased depending on the concentration of the starch degradation product, while it was no differences depending on the DE value. On the other hand, it was found that the processed foods with noodles 7-1, 8-1, 9-1, and 10-1 using the seasoning liquid containing 20% by mass of the starch degradation product could not obtain a sufficient breaking strength as compared with the normal heat-treated noodles.

[5. Sensory Test]

5-1. Test Method

The processed foods with noodles 7-1 to 10-5 were evaluated by five panels having discriminating ability according to the following evaluation criteria. Table 3 shows the average value of the evaluation points.

5-2. Evaluation Criteria

<Texture>
5: Comparable to that of the normal heat-treated noodles
4: Good
3: Moderate
2: A little feeling of strangeness
1: A Feeling of strangeness <"Koshi (Chewy Texture)" (Springiness (Firmness))>
5: Enough firmness
4: firmness
3: Moderate firmness
2: Soft
1: No firmness at all <Sweetness>
5: No sweetness that can be sensed
4: Sweetness that can be ignored
3: Slightly sweet
2: Sweet
1: Sweet, with a feeling of strangeness

TABLE 2

| | Starch degradation product | | Breaking strength (N) |
|---|---|---|---|
| | DE value | Content (% by mass) | |
| Normal heat-treated noodles | — | — | 0.28 |
| Processed food with noodles 7-1 | 25 | 20 | 0.17 |
| Processed food with noodles 7-2 | | 25 | 0.23 |
| Processed food with noodles 7-3 | | 35 | 0.33 |
| Processed food with noodles 7-4 | | 40 | 0.47 |
| Processed food with noodles 7-5 | | 45 | 0.58 |
| Processed food with noodles 8-1 | 18 | 20 | 0.18 |
| Processed food with noodles 8-2 | | 25 | 0.25 |
| Processed food with noodles 8-3 | | 35 | 0.36 |
| Processed food with noodles 8-4 | | 40 | 0.51 |
| Processed food with noodles 8-5 | | 45 | 0.60 |
| Processed food with noodles 9-1 | 11 | 20 | 0.16 |
| Processed food with noodles 9-2 | | 25 | 0.26 |
| Processed food with noodles 9-3 | | 35 | 0.39 |
| Processed food with noodles 9-4 | | 40 | 0.42 |
| Processed food with noodles 9-5 | | 45 | 0.62 |
| Processed food with noodles 10-1 | 4 | 20 | 0.20 |
| Processed food with noodles 10-2 | | 25 | 0.32 |
| Processed food with noodles 10-3 | | 35 | 0.39 |
| Processed food wtih noodles 10-4 | | 40 | 0.47 |
| Processed food with noodles 10-5 | | 45 | — |

TABLE 3

| | Texture | "Koshi" (springiness (firmness)) | Sweetness | Average point |
|---|---|---|---|---|
| Processed food with noodles 7-1 | 2 | 2 | 5 | 3 |
| Processed food with noodles 7-2 | 4 | 3 | 3 | 3.3 |
| Processed food with noodles 7-3 | 4 | 5 | 2 | 3.6 |
| Processed food with noodles 7-4 | 4 | 5 | 2 | 3.6 |
| Processed food with noodles 7-5 | 4 | 5 | 2 | 3.6 |
| Processed food with noodles 8-1 | 2 | 3 | 5 | 3.3 |
| Processed food with noodles 8-2 | 4 | 4 | 5 | 4.3 |
| Processed food with noodles 8-3 | 5 | 5 | 3 | 4.3 |
| Processed food with noodles 8-4 | 4 | 5 | 3 | 4 |
| Processed food with noodles 8-5 | 4 | 5 | 2 | 3.6 |
| Processed food with noodles 9-1 | 3 | 2 | 5 | 3.3 |
| Processed food with noodles 9-2 | 5 | 5 | 5 | 5 |
| Processed food with noodles 9-3 | 4 | 5 | 5 | 4.6 |

TABLE 3-continued

| | Texture | "Koshi" (springiness (firmness)) | Sweetness | Average point |
|---|---|---|---|---|
| Processed food with noodles 9-4 | 4 | 5 | 4 | 4.3 |
| Processed food with noodles 9-5 | 2 | 5 | 2 | 3 |
| Processed food with noodles 10-1 | 2 | 3 | 5 | 3.3 |
| Processed food with noodles 10-2 | 4 | 5 | 5 | 4.6 |
| Processed food with noodles 10-3 | 4 | 5 | 5 | 4.6 |
| Processed food with noodles 10-4 | 4 | 5 | 5 | 4.6 |
| Processed food with needles 10-5 | — | — | — | — |

As shown in the results of Table 3, it was found that the processed foods with noodles 8-2 to 8-4, 9-2 to 9-4, 10-2 to 10-4 using the seasoning liquid containing the starch degradation product having a DE value of 4 to 18 in the range between 25% by mass and 40% by mass are favorable in all of texture, "Koshi (chewy texture)" (springiness (firmness)) and sweetness. On the other hand, it was found that the processed foods with noodles 7-5, 8-5, 9-5, 10-5 using the seasoning liquid containing 45% by mass of the starch degradation product are not suitable for the product because the seasoning liquid was increased in its viscosity entirely, and thereby it was difficult to blend together with noodles (pasta). Moreover, it was found that the processed foods with noodles 7-1 to 7-5 using the seasoning liquid containing the starch degradation product having a DE value of 25 are not suitable for the product because the sweetness of the seasoning liquid became too high.

[6. Production of Processed Food with Noodles (Chinese Noodles)]

<Production of Processed Food with Noodles 11>

6-1. Pretreatment Process 1 (Boil Heat Treatment Process)

Chinese noodles (manufactured by Iijima Noodles Co., Ltd., moisture value 32%, noodle thickness 3.0 mm) 1000 g was put into boiling water in the amount of 10 times or more, and boil-heated for 1 minute while unraveling the Chinese noodles.

6-2. Pretreatment Process 2 (Steam Heat Treatment Process)

Water was drained from the Chinese noodles after the boil heat treatment, and the Chinese noodles were filled in a packaging material (bag) made of a heat-resistant plastic material. The opening of the packaging material (bag) was sealed using a vacuum sealer, and the packed noodles was steam-heated at 90° C. for 30 minutes using a steam convection oven (manufactured by Maruzen Co., Ltd.).

6-3. Pretreatment Process 3 (Freeze Treatment Process)

The Chinese noodles after steam heat treatment were placed in a freezing stocker (manufactured by JCM CO., LTD.), and frozen at −20° C. for 72 hours to obtain frozen Chinese noodles.

6-4. Seasoning Liquid Preparation Process

A seasoning liquid was prepared by blending the following components: Worcester sauce 19.6% by mass, bonito broth 1.6% by mass, garlic 0.4% by mass, water 31.7% by mass, glutamic acid 0.8% by mass, nucleic acid 0.2% by mass, black pepper 0.2% by mass, processed onion product 0.8% by mass, sugar 1.1% by mass, and dextrin having a DE value of 8 ("Paindex #1" manufactured by Matsutani Chemical Industry Co., Ltd.) 23.8% by mass.

6-5. Heat Sterilization Process

The seasoning liquid 100 g was filled in a retort container ("plain bag for retort" manufactured by Shueidou Co., Ltd.), and the frozen Chinese noodles 140 g is thawed at room temperature, and then taken out from its packaging material (bag), followed by filling the Chinese noodles together with the following ingredients: stir-fried perfume oil 3 g, cabbage 15 g, onion slices 20 g, and pork 15 g in the retort container. The retort container was sealed at its opening using a vacuum sealer, and heat-sterilized using a shower-type retort sterilizer to prepare a processed food with noodles 11. The conditions for the pressure heat sterilization treatment were set temperature of 125° C., maximum pressure of 0.25 MPa, heating for 9 minutes after the temperature in the apparatus reached 125° C., and an F value of 7.7.

[7. Measurement of Breaking Strength]

The processed food with noodles 11 produced in 6 above was stored at room temperature for 30 days, then put into boiling water for 10 minutes, and the breaking strength of the noodles immediately after opening its container was determined in the same manner as the conditions and methods described in 2-1 and 2-2 above. The breaking strength of the noodles was 0.4125.

In addition, 1000 g of Chinese noodles same as the Chinese noodles used in the processed food with noodles 11 produced in 6 above were put into boiling water in the amount of 10 times or more, and boil-heated for 5 minutes while unraveling the Chinese noodles (normal heat-treated noodle). Its breaking strength was 0.4074.

From the above, it was found that according to the method of producing a processed food with noodles in a container according to one embodiment of the present invention, even if the noodles are Chinese noodles, the breaking strength can be obtained that is equivalent to that of the normal heat-treated noodles.

INDUSTRIAL APPLICABILITY

A container-packed processed food with noodles produced according to the method of producing a container-packed processed food with noodles according to one embodiment of the present invention can provide an additional value as a new processed food, since it can be prevented from collapsing by cooking or boiling, and maintained in an appropriate firmness even after stored for a long period of time, without impairing an original taste of a raw material of the noodles.

We claim:

1. A method of producing a container-packed processed food with noodles, comprising:
   subjecting noodles to boil heat treatment and steam heat treatment, and subjecting the boiled and steamed noodles to freeze treatment to obtain frozen noodles; and
   subjecting a container filled with the frozen noodles and a seasoning liquid containing a starch degradation product to heat sterilization treatment to obtain the container-packed processed food with noodles, wherein the starch degradation product has a DE value of 11-18 and is present in the range between 25% by mass and 40% by mass in the seasoning liquid, and
   wherein the container-packed processed food with noodles can be stored at room temperature.

2. The method according to claim 1, wherein the container-packed processed food with noodles has a breaking strength of the noodles after storage for 30 days within ±20% of that of noodles subjected only to normal boil heat treatment without steam treatment, freeze treatment, later addition of the starch degradation product, and heat sterilization treatment.

3. The method according to claim 1, wherein the noodles are at least one selected from the group consisting of Chinese noodles, pasta, and udon.

4. The method according to claim 1, wherein the noodles subjected to boil heat treatment and steam heat treatment are raw or fresh noodles.

\* \* \* \* \*